(12) United States Patent
Barkie et al.

(10) Patent No.: US 9,519,632 B1
(45) Date of Patent: Dec. 13, 2016

(54) WEB DOCUMENT ANNOTATION SERVICE

(71) Applicant: International Business Machines Corporation, Armonk, NY (US)

(72) Inventors: Eric J. Barkie, Cary, NC (US); Benjamin L. Fletcher, Denver, CO (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/978,495

(22) Filed: Dec. 22, 2015

(51) Int. Cl.
*G06F 17/22* (2006.01)
*G06F 17/24* (2006.01)
*G06F 17/21* (2006.01)

(52) U.S. Cl.
CPC ........... *G06F 17/241* (2013.01); *G06F 17/212* (2013.01); *G06F 17/2247* (2013.01)

(58) Field of Classification Search
CPC ................ G06F 17/241; G06F 3/04883; G06F 17/30997; G06F 17/2247; G06F 17/242
See application file for complete search history.

(56) References Cited

U.S. PATENT DOCUMENTS

| 5,768,603 | A * | 6/1998 | Brown ................. G06F 17/2755 704/232 |
| 7,225,397 | B2 * | 5/2007 | Fukuda ................. G06F 17/211 715/230 |
| 7,266,765 | B2 * | 9/2007 | Golovchinsky ....... G06F 17/242 715/205 |
| 7,908,312 | B2 * | 3/2011 | Kang ..................... G06Q 10/00 709/201 |
| 8,271,424 | B2 * | 9/2012 | Bourges-Waldegg G06F 21/6209 380/277 |
| 8,533,130 | B2 | 9/2013 | Ershov |
| 8,788,502 | B1 * | 7/2014 | Hensel .............. G06F 17/30864 707/738 |
| 9,053,086 | B2 * | 6/2015 | Dubbels .............. G06F 17/2705 |
| 2003/0081000 | A1 * | 5/2003 | Watanabe .............. G06F 17/241 715/751 |
| 2004/0003349 | A1 * | 1/2004 | Ostertag ............. G06F 17/2247 715/234 |
| 2004/0078757 | A1 * | 4/2004 | Golovchinsky ....... G06F 17/242 715/205 |
| 2004/0138946 | A1 * | 7/2004 | Stolze ............... G06F 17/30867 705/14.6 |
| 2004/0161150 | A1 | 8/2004 | Cukierman et al. |
| 2004/0260714 | A1 * | 12/2004 | Chatterjee ......... G06F 17/30873 |
| 2005/0065958 | A1 * | 3/2005 | Dettinger .......... G06F 17/30525 |

(Continued)

*Primary Examiner* — Maikhanh Nguyen
(74) *Attorney, Agent, or Firm* — Scully, Scott, Murphy & Presser, P.C.; Louis J. Percello, Esq.

(57) ABSTRACT

Annotating web content, in one aspect, may include detecting a request to navigate to a web site for content on a web browser. A component such as a web browser plugin, extension or the like transmits a uniform resource locator (URL) associated with the web site to a computer-implemented service that stores annotations to the content separate from the web site that is providing the content, and receives from the computer-implemented service one or more annotations to the content. The web browser plugin or the like renders the one or more annotations within the content from the web site. The content rendered with the annotations may be displayed within a display window of the web browser.

14 Claims, 4 Drawing Sheets

(56) References Cited

U.S. PATENT DOCUMENTS

2005/0165852 A1* 7/2005 Albornoz .......... G06F 17/30997
2008/0294610 A1 11/2008 Strosaker et al.
2011/0145240 A1* 6/2011 Sridharan ......... G06F 17/30011
                707/737
2014/0164408 A1* 6/2014 Dubbels ............... G06F 17/227
                707/755

* cited by examiner

| | |
|---|---|
| 202 — STRING URL OF WEB CONTENT | |
| 204 — STRING HASH CONTENT | |
| 206 — ARRAY CHANGES | 208 — INTEGER CHARACTER POSITION WITHIN DOCUMENT |
| | 210 — ARRAY OF CHANGES AT POSITION |
| | 212 — STRING HASH OF CHANGE |
| | 214 — INTEGER LENGTH OF CHANGE |
| | 216 — ENUMERATED TYPE OF CHANGE |
| | 218 — OBJECT CHANGE |

FIG. 2

WEB DOCUMENT ANNOTATION SERVICE

FIELD

The present application relates generally to computers and computer applications, and more particularly to a web document annotation service in a computing environment that may include a shared pool of configurable computing resources.

BACKGROUND

Publically accessible content on the Internet is owned by many different entities. Much of this content can be utilized for seeding a corpus for cognitive technologies such as Watson™ from International Business Machines Corporation (IBM®) of Armonk, N.Y. Cognitive technologies then may add value to this content. The entity performing the cognitive techniques on the content may own the added value of the content, if it is maintained separately from the third party content. For example, machine annotations of entities and relationships in a third party owned online news article may be owned by the cognitive technology entity that produced the annotations while the online news article is still owned by the third party. As another example, an online community of users hosted on a platform created by the entity can generate relevant data about both the third party content and the entity owned content, which would also be owned by the entity. For instance, a discussion of the entities, relationships, the entity's other content would be owned by the entity.

It is, therefore, desirable to maintain a separation between third party content and a particular entity owned content while also being able to combine the two in a simple, intuitive, efficient, permitted manner.

BRIEF SUMMARY

A computer-implemented method and system of annotating web content may be provided. The method, in one aspect, may include detecting a request to navigate to a web site for content on a web browser. The method may also include transmitting a uniform resource locator (URL) associated with the web site to a computer-implemented service that stores annotations to the content separate from the web site that is providing the content. The method may also include receiving from the computer-implemented service one or more annotations to the content. The method may further include rendering the one or more annotations within the content from the web site. The method may also include displaying within a display window of the web browser, the content rendered with the annotations.

A system of annotating web content, in one aspect, may include a hardware processor communicatively coupled to a communication network. A web browser component may execute on the hardware processor cooperatively with a web browser, and may be operable to detect a request to navigate to a web site for content. The web browser component may be further operable to transmit a uniform resource locator (URL) associated with the web site over the communication network to a computer-implemented service that stores annotations to the content separate from the web site that is providing the content. The web browser component may be further operable to receive from the computer-implemented service one or more annotations to the content. The web browser component may be further operable to render the one or more annotations within the content from the web site. The content rendered with the annotations may be displayed within a display window of the web browser.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a diagram illustrating a data structure in one embodiment of the present disclosure used for storing and communicating the content data between the cloud service and browser component, e.g., plugin/extension of the present disclosure in one embodiment.

DETAILED DESCRIPTION

Figure 1:
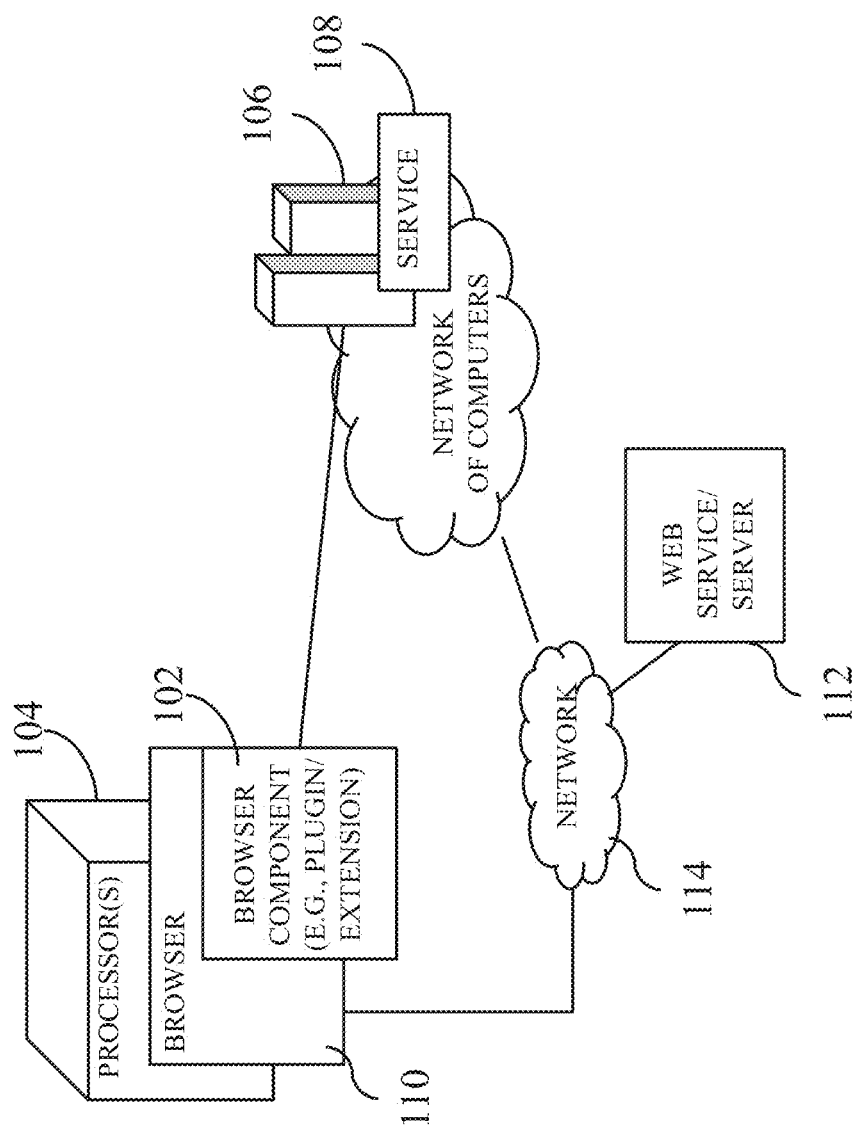
FIG. 1 is a diagram illustrating components of a system that provides web annotation in one embodiment of the present disclosure.

Social network or media platforms or services, for example, implemented via one or more computer servers, allow user to communicate online and share interests. For instance, users may post and blog information or discussion to a group of audience, for example, in the user's online community of friends, via a user interface such as a browser, and view others' posts and blogs.

These are platforms where users can also share and discuss third party content such as news articles. These discussions occur entirely on the platforms (not within the article itself) or through embedded web plugins, for example, a social network application's plugin embedded in a display that shows the news article, for example, usually at the bottom of a news article.

In one embodiment of the present disclosure, a cloud-based system and method are presented for marking up a web document with third party content (e.g. an entity owned content such as annotations and discussions from users occurring via an entity owned platform) directly in the document itself. In one embodiment of a method and/or system of the present disclosure, these mark ups are facilitated through the use of a computer-executable component that can be added on to a browser or the like, e.g., a browser plugin or extension or the like. Users are able to consume the value of both the document contents as well as relevant entity content without having to load each separately.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The cloud computing paradigm may be different from other computing domains, for example, in that the cloud can be viewed to an extent as having infinite scalability. For instance, while in traditional projects managers are constrained by the number of resources to perform a task, in the cloud one can assign as many resources as one may want to perform a task. Releasing resources in the cloud can be instantaneous, which may not be the case with regular project management. With the cloud computing, one can start with a very small number of resources and grow as needed, paying only for what was used.

FIG. 1 is a diagram illustrating components of a system that provides web annotation in one embodiment of the present disclosure. The components of the system in one embodiment may include a computer-executable component 102, e.g., browser plugin and/or extension running on one or more hardware processors 104 and a service provided in a computing environment comprising a share pool of configurable computing resources, also referred to as a cloud service. For instance, a service 108 may be deployed on one or more computing resources 106, and provided, for example, on demand, for example, over the Internet. A example implementation of the cloud service may include a Hypertext Transfer Protocol (HTTP) representational state transfer (REST) application programming interface (API) which takes a web uniform resource locator (URL) 202 as input and expects the data structure shown in FIG. 2 to be returned as output (a list of zero or more length). A browser plugin or the like may utilize that output and perform the appropriate changes.

A browser plugin may include a computer-executable component or program that adds a specific feature to a web browser, e.g., an existing web browser. For instance, the browser plugin may utilize a web browser's registration mechanism to register with the web browser and a data exchange mechanism to exchange data with the web browser. For example, application programming interfaces (APIs) of a web browser may be used to implement plug-ins. A browser plugin may be updated and modified without having to also modify the web browser. A browser plugin may be written in computer compiler/interpreter languages.

A browser extension may include a computer-executable component or program that may perform added functionality to a web browser, e.g., an existing web browser, for example, providing additional capability to the web browser. A browser extension may add onto the web browser's user interface and process web pages or content that the browser loads. A browser extension may be written in many different computer compiler/interpreter languages. A browser's APIs may be used to implement a browser extension.

The browser plugin and/or extension 102 may query the cloud service for relevant content related to the currently loaded web document and facilitate the markups to the web document in place.

For example, consider an example based on an online news article. A user using a web browser 110 navigates to a news web site 112 via a communication and/or data network 114 and loads a news article on the news web site in the web browser 110. A browser plugin 102 of the present disclosure in one embodiment, for example, functionally integrated with the browser 110, may submit the uniform resource locator (URL) of the news article to a cloud service 108 of the present disclosure in one embodiment. The cloud service 108 in one embodiment may look up relevant content for the news article based on the URL. This content may include: a) Discussions that occurred between users regarding the content, for example, while they were viewing the content, for instance, discussions between users around a highlighted sentence within an article; b) Highlighted annotations of key entities and relationships within the article; c) Machine translations to other languages of the article contents; d) Indication of sentiment to the content, e.g., words indicating sentiment (e.g., positive or negative). This information may be stored in the cloud service 108. Existing text analysis cloud services, for example, which may utilize sophisticated natural language processing (NLP) algorithms, may be used to automatically analyze the news article URL and provide a language analysis. The analysis may include extracting or detecting elements such as entities, keywords, taxonomy, concepts, sentiment, and relationships.

In one embodiment, the content is returned from the cloud service 108 to the browser plugin 102 as an array of markups containing dictionaries and/or tuples. For instance, the content returned may contain: a) Character position within the article where the markup is anchored; b) Length of change; c) Delta or change content to be applied to the content at the anchor over given length (e.g., translated text, highlight), and/or d) Additional content to be tethered at the anchor (e.g., user discussions). A plurality (or an array) of such content may be provided by the service 108 and received at the browser 110, e.g., via the browser plugin 102.

FIG. 2 is a diagram illustrating an example data structure in one embodiment of the present disclosure used for storing and communicating the content data between the cloud service and browser plugin/extension of the present disclosure in one embodiment. The data content may be stored in the data structure format in the cloud service and may be communicated to the browser plugin. For instance, the browser plugin may receive the annotations in a data structure format. For instance, the data structure may include the following fields: String URL of web content (e.g., article) 202, String Hash of contents 204, Array of changes sorted by character positions within document 206 comprising the following fields: Integer Character Position within document 208, Array of changes at position 210, String Hash of change 212, Integer Length of change (can be null) 214, Enumerated Type of change 216, Object Change 218.

The hashes may be used to verify that the source content that is being changed is what is intended and that it has not been modified or deviate from that intended change. For example, if a news article has been modified, either corrected or expanded, previous changes may no longer be relevant. In one embodiment, the first hash 204 validates that the content body as a whole is identical to what was originally seen. The second hash 212 is a hash of the changes (portions of the content being changed), e.g., shown at 208, 210, 214, and represents what is being changed. In one embodiment, using one or both of the two hashes, change may be invalidated if any of the content has changed (204) and/or if only the content that is the target of the change, has changed (212).

The enumerated type of change 216 represents the operation to be performed. Examples of enumerated types may include, but are not limited to, items such as replace, highlight, strikethrough, embed image, pop-up comments, and/or others. For example, following a quote by a user an embedded image may be added with an emoticon that indicates the sentiment of the quote.

In one embodiment, the object change 218 varies based on the enumerated type of change 216. In the above example of an embedded image, the corresponding object change may be the actual emoticon. As another example, if the enumerated type of change is a replace type, a corresponding object change may be the replacement text.

Referring to FIG. 1, in one embodiment, a computer-executable component such as the browser plugin 102 orders the changes by character position and performs a scan over the document, applying changes at each anchor point. The changes are rendered within the browser display for the end user. For instance, a computer-executable component such as the browser plugin 102 or the browser 110 cooperating with the computer-executable component (e.g., browser plugin) 102, may display the data or changes in a corresponding character position of the content displayed in the browser display.

Figure 3:
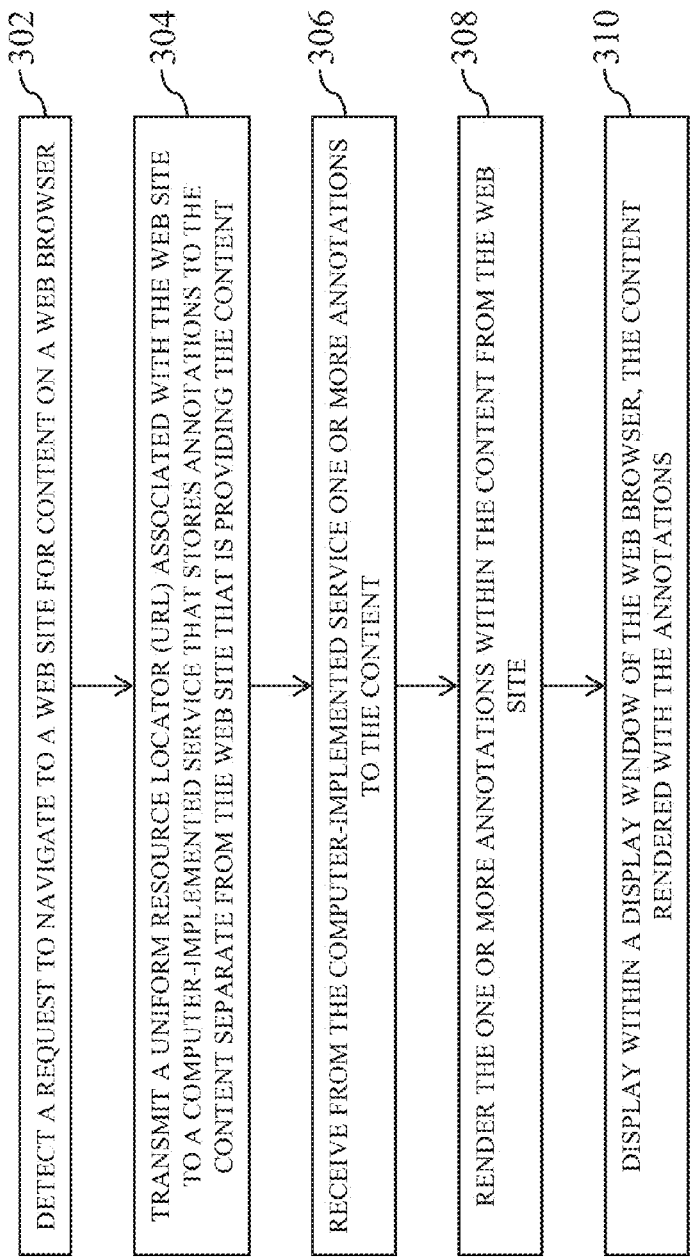
FIG. 3 is a flow diagram illustrating a computer-implemented method of annotating web content in one embodiment of the present disclosure.

FIG. 3 is a flow diagram illustrating a computer-implemented method of annotating web content in one embodiment of the present disclosure. At 302, a request to navigate to a web site for content on a web browser is detected. A user using a web browser may enter a URL or another site identifier to navigate to a web site. A web browser plugin may detect the request, responsive to the web browser receiving the URL or another site identifier, e.g., entered by a user or by another method. The web browser plugin, e.g., may receive the URL, via the web browser.

At 304, the web browser plugin may transmit the uniform resource locator (URL) associated with the web site to a computer-implemented service that stores annotations to the content. The computer-implemented service is separate from the web site or web server that is providing the content, and may be a different entity. For instance, an entity performing cognitive analysis on various content available on web sites, may store the results of the cognitive analysis associated with different web site content on its computer system or platform. In one embodiment, the computer-implemented service is deployed on a computing environment comprising a shared pool of configurable computing resources, e.g., the service may be a cloud-based service.

The annotations to the content that is stored by the service and communicated to the web browser plugin may include one or more of discussions that occurred between users regarding the content, entities and relationships within the article, one or more machine translations to different languages of the contents, or indication of sentiment to the content, or combinations thereof.

At 306, the web browser plugin receives from the computer-implemented service one or more annotations to the content. The annotations received may include information such as a character position within the content where the annotations are anchored, length of change in the content, and the change to be applied to the content at the anchor over the length. For instance, the web browser plugin may receive a data string comprising the URL, a data array comprising a character position within the content and an array of changes at the character position.

At 308, the web browser plugin renders the one or more annotations within the content from the web site. For example, the web browser plugin may order the changes by the character position, e.g., if not already in an order, scan the content and apply the changes to the content at the character position.

At 310, the content rendered with the annotations may be displayed within a display window of the web browser.

While the above description may use the terminology browser plugin and browser extension, the methodology of the present disclosure may be implemented as another computer-executable component performing similar functionality, for example, any other computer-executable component that can cooperate with a browser to perform functionalities described herein.

Figure 4:
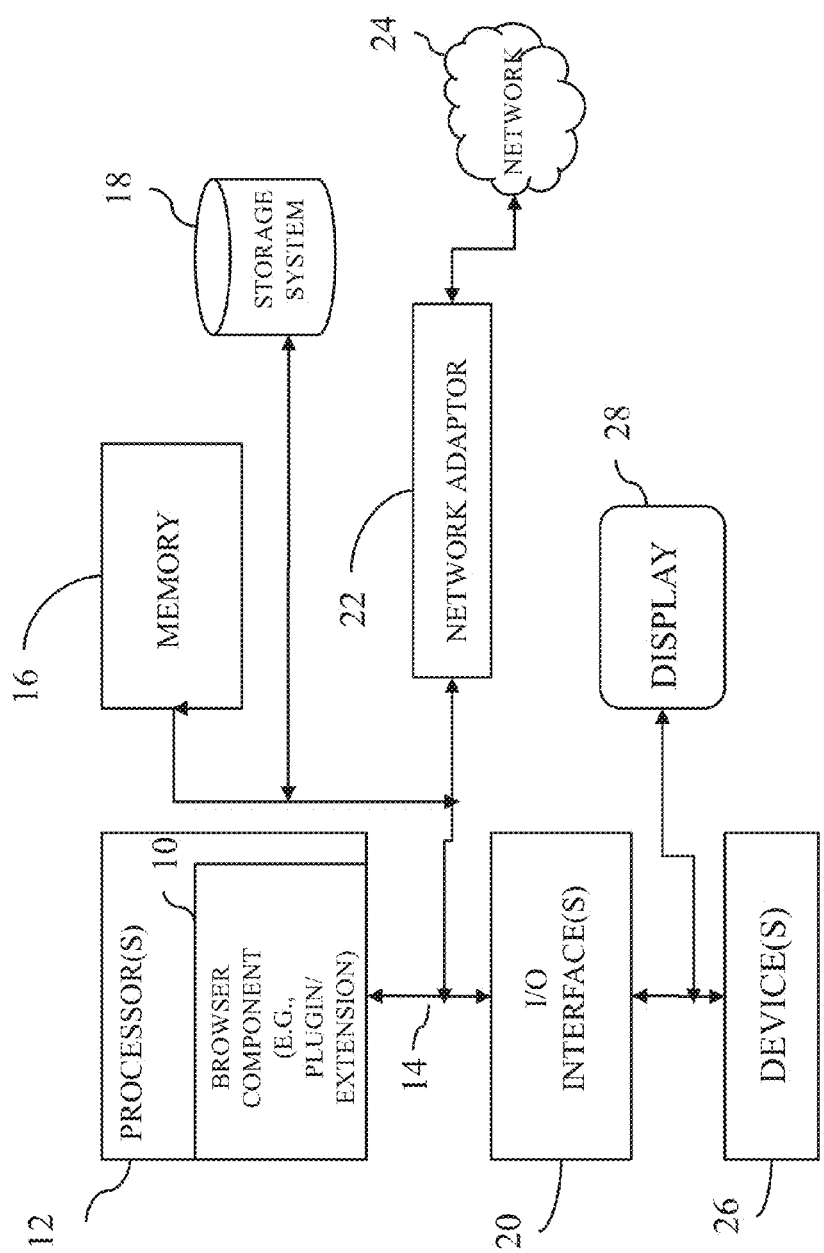
FIG. 4 illustrates a schematic of an example computer or processing system that may implement a web annotation system in one embodiment of the present disclosure.

FIG. 4 illustrates a schematic of an example computer or processing system that may implement a web annotation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof. The module 10 may be a web browser plugin module or the like component. In another aspect, the module 10 may implement a service that stores content annotations which may transmit the annotations to a web browser plugin module at a remote location.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of annotating web content, the method executed by one or more hardware processors, comprising:
   detecting navigation to a web site for content on a web browser and the content loaded on the web browser;
   transmitting a uniform resource locator (URL) associated with the web site to a computer-implemented service that stores annotations to the content separate from the web site that is providing the content;
   receiving from the computer-implemented service one or more annotations to the content; and
   displaying within a display window of the web browser, the annotations within the content loaded on the web browser,
   wherein the annotations to the content comprises at least a discussion that occurred between users regarding the content,
   wherein the one or more annotations received from the computer-implemented service comprises a first hash associated with a whole body of the content and a second hash associated with a portion of the content being changed with the annotations, changes with annotations invalidated based on the first hash and the second hash,
   wherein the one or more annotations received from the computer-implemented service comprises a data string comprising the URL, a data array comprising a character position within the content and an array of changes at the character position,
   wherein the changes are ordered by the character position, the content is scanned and the changes are applied to the content at the character position to render the one or more annotations within the content from the web site.

2. The method of claim 1, wherein one or more of a web browser plugin or extension integrated with the web browser performs the detecting, transmitting, receiving and displaying.

3. The method of claim 1, wherein the computer-implemented service is deployed on a computing environment comprising a shared pool of configurable computing resources.

4. The method of claim 1, wherein the annotations to the content further comprise one or more of entities and relationships within the article, one or more machine translations to different languages of the contents, or indication of sentiment to the content, or combinations thereof.

5. The method of claim 1, wherein the one or more annotations received from the computer-implemented service comprises a character position within the content where the annotations are anchored, length of change in the content, the change to be applied to the content at the anchor over the length.

6. A system of annotating web content, comprising:
   a hardware processor communicatively coupled to a communication network;
   a web browser component executing on the hardware processor cooperatively with a web browser, and operable to detect navigation to a web site for content and the content loaded on the web browser,
   the web browser component further operable to transmit a uniform resource locator (URL) associated with the web site over the communication network to a computer-implemented service that stores annotations to the content separate from the web site that is providing the content,
   the web browser component further operable to receive from the computer-implemented service one or more annotations to the content,
   wherein the annotations is displayed within the content loaded within a display window of the web browser within the content loaded on the web browser,
   wherein the annotations to the content comprises at least a discussion that occurred between users regarding the content,
   wherein the one or more annotations received from the computer-implemented service comprises a first hash associated with a whole body of the content and a second hash associated with a portion of the content being changed with the annotations, changes with annotations invalidated based on the first hash and the second hash,
   wherein the one or more annotations received from the computer-implemented service comprises a data string comprising the URL, a data array comprising a character position within the content and an array of changes at the character position,
   wherein the web browser component orders the changes by the character position, scans the content and applies the changes to the content at the character position to render the one or more annotations within the content from the web site.

7. The system of claim 6, wherein the computer-implemented service is deployed on a computing environment comprising a shared pool of configurable computing resources.

8. The system of claim 6, wherein the annotations to the content further comprise one or more of entities and relationships within the article, one or more machine translations to different languages of the contents, or indication of sentiment to the content, or combinations thereof.

9. The system of claim 6, wherein the one or more annotations received from the computer-implemented service comprises a character position within the content where the annotations are anchored, length of change in the content, the change to be applied to the content at the anchor over the length.

10. A computer readable storage medium storing a program of instructions executable by a machine to perform a method of annotating web content, the method comprising:
    detecting navigation to a web site for content on a web browser and the content loaded on the web browser;
    transmitting a uniform resource locator (URL) associated with the web site to a computer-implemented service that stores annotations to the content separate from the web site that is providing the content;
    receiving from the computer-implemented service one or more annotations to the content; and
    displaying within a display window of the web browser, the annotations within the content loaded on the web browser,
    wherein the annotations to the content comprises at least a discussion that occurred between users regarding the content,
    wherein the one or more annotations received from the computer-implemented service comprises a first hash associated with a whole body of the content and a second hash associated with a portion of the content being changed with the annotations, changes with annotations invalidated based on the first hash and the second hash, wherein the one or more annotations received from the computer-implemented service comprises a data string comprising the URL, a data array comprising a character position within the content and an array of changes at the character position, wherein the changes are ordered by the character position, the content is scanned and the changes are applied to the content at the character position to render the one or more annotations within the content from the web site.

11. The computer readable storage medium of claim 10, wherein a web browser component integrated with the web browser performs the detecting, transmitting, receiving and displaying.

12. The computer readable storage medium of claim 10, wherein the computer-implemented service is deployed on a computing environment comprising a shared pool of configurable computing resources.

13. The computer readable storage medium of claim 10, wherein the annotations to the content further comprise one or more of entities and relationships within the article, one or more machine translations to different languages of the contents, or indication of sentiment to the content, or combinations thereof.

14. The computer readable storage medium of claim 10, wherein the one or more annotations received from the computer-implemented service comprises a character position within the content where the annotations are anchored, length of change in the content, the change to be applied to the content at the anchor over the length.

* * * * *